United States Patent [19]
Yoneda

[11] Patent Number: 6,147,765
[45] Date of Patent: Nov. 14, 2000

[54] PRINTER SYSTEM, PRINTER, COMPUTER WITH PRINTER, PRINTING CONTROL METHOD, AND MEDIUM FOR RECORDING PRINTING CONTROL PROGRAM

[75] Inventor: Noboru Yoneda, Kawasaki, Japan

[73] Assignee: Fujitsu Limited, Kawasaki, Japan

[21] Appl. No.: 09/154,744

[22] Filed: Sep. 17, 1998

[30] Foreign Application Priority Data

Sep. 19, 1997 [JP] Japan .................................. 9-254408

[51] Int. Cl.<sup>7</sup> ...................................................... G06F 15/00
[52] U.S. Cl. ........................................ 358/1.15; 358/1.13
[58] Field of Search .................................. 358/1.15, 1.13, 358/1.14, 1.1, 1.6, 468, 407, 1.18, 434, 435, 436, 437, 438, 439; 347/142; 399/1, 8; 710/8, 14, 15, 16, 17, 18, 19, 62, 72

[56] References Cited

U.S. PATENT DOCUMENTS 5,640,495   6/1997   Colbert et al. .......................... 358/1.13

FOREIGN PATENT DOCUMENTS 8-185288   7/1996   Japan .
8-328768   12/1996  Japan .
9-269878   10/1997  Japan .

Primary Examiner—Dov Popovici
Attorney, Agent, or Firm—Armstrong, Westerman, Hattori, McLeland & Naughton

[57] ABSTRACT

A computer communicates with a printer. The computer has a printer communication controller for controlling one-way and two-way modes for printing. The printer has a printing controller for controlling the one-way and two-way modes. The computer sends a switching signal to the printer through a switching signal line, to switch the printer from the one-way mode to the two-way mode. The switching signal is a signal in response to which the printer can return a response to the computer through a reception channel even if the printer is offline. Upon receiving the switching signal, the printer returns a response to the computer and switches to a pseudo two-way mode that is a temporary online state. If the computer sends a printing start command thereafter to the printer, the printer switches from the pseudo two-way mode to the two-way mode. This arrangement easily switches the one-way and two-way modes from one to another. Also provided are a printer system involving the computer and printer, a printing control method for operating the computer in the manner mentioned above, and a medium for recording a program that achieves the printing control method.

18 Claims, 13 Drawing Sheets

Fig. 5

| COMPUTER | | PRINTER |
|---|---|---|
| PRINTER COMMUNICATION CONTROLLER | INTERFACE CONTROLLER | |
| (1) INSTRUCT TO START PRINT JOB<br>(1)'Open( )⟶ | | (ONE-WAY MODE) |
| (2) SEND PRINT DATA<br>(3)Write(data)⟶ | (4) TRANSFER PRINT DATA<br>(5)data⟶ | (16) STORE RECEIVED DATA IN RECEPTION BUFFER (PRINT DATA) |
| (7)Write(data)⟶<br>(REPEAT Write(data) TO TRANSFER ALL PRINT DATA) | (18) TRANSFER PRINT DATA<br>(9)data⟶ | |
| (10) INSTRUCT TO END PRINT JOB<br>(11)Close( )⟶ | | |

Fig. 6A

| COMPUTER | | | PRINTER |
|---|---|---|---|
| PRINTER COMMUNICATION CONTROLLER | TWO-WAY-COMMUNICATION CONTROLLER | INTERFACE CONTROLLER | |
| (1) INSTRUCT TO START PRINT JOB (1)'Open() → | (1)"Open() → | | (ONE-WAY MODE) |
| | (2) REQUEST PRINTER STATUS (3)Read() → | (4) READ PRINTER STATUS ↑ (6) INFORM OF RECEIVED DATA ↓ | (5) TRANSMIT PRINTER STATUS |
| | (7) COMMAND TO START TWO-WAY COMMUNICATION (7)'Write(cmd open) → | (8) WRITE COMMAND (9) cmd open → ← (12) res open | (PSEUDO TWO-WAY MODE) (10) RECEIVE COMMAND (11) TRANSMIT RESPONSE |
| (2) SEND PRINT DATA (13) Write(data) → | (14) COMMAND TO TRANSFER PRINT DATA (14)'Write(cmd data) → | (15) WRITE COMMAND (15)'cmd data → ← (18) res data | (TWO-WAY MODE) (16) RECEIVE COMMAND (SEPARATE PRINT DATA AND WRITE IT INTO RECEPTION BUFFER) (17) TRANSMIT RESPONSE |

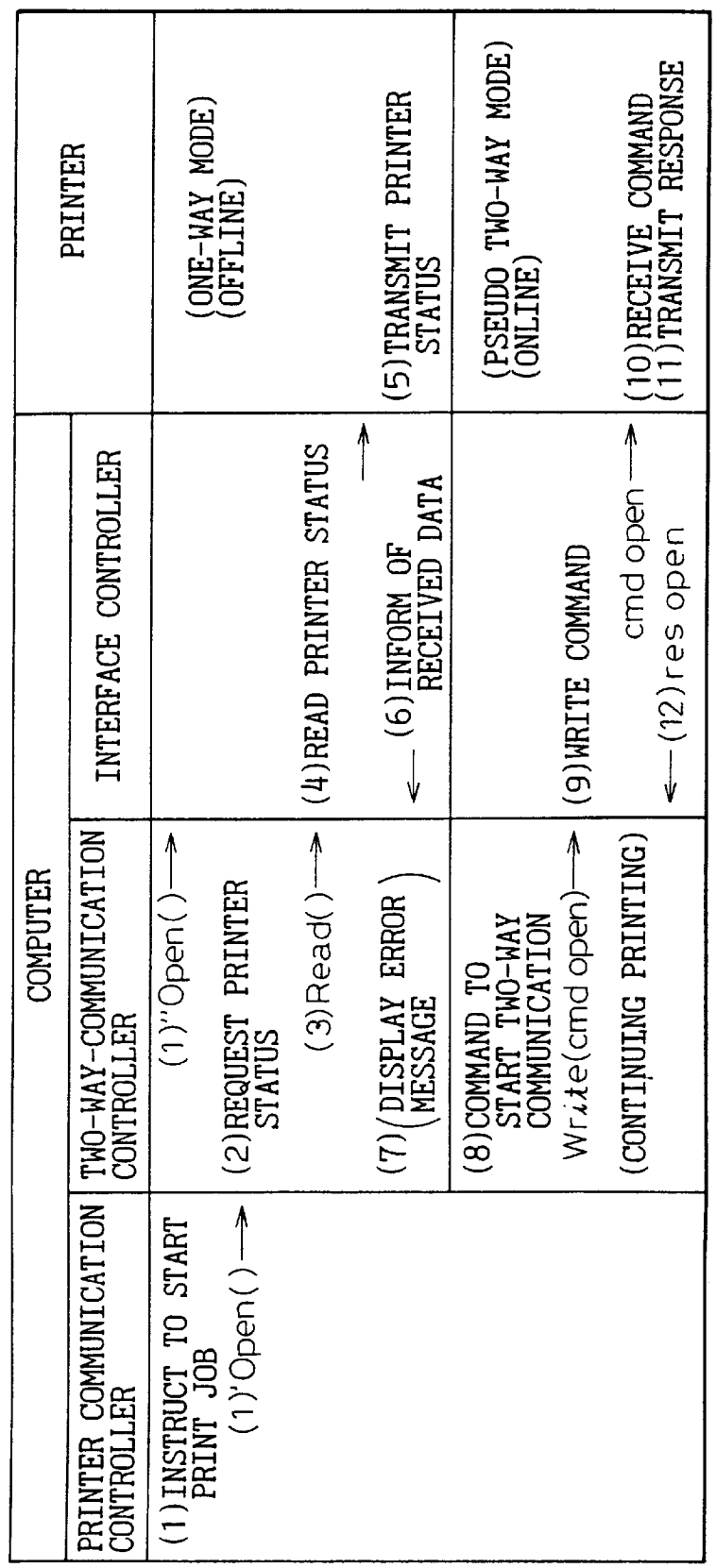

Fig. 11
PRIOR ART

| COMPUTER | | PRINTER |
|---|---|---|
| ONE-WAY PRINTER CONTROLLER | INTERFACE CONTROLLER | (ONE-WAY MODE) (OFFLINE) |
| INSTRUCT TO START PRINT JOB (1) Open( ) ⟶ | | |
| SEND PRINT DATA (2) Write(data) ⟶ | TRANSFER PRINT DATA (RETURN ON OFFLINE ERROR) | |
| (3) DISPLAY OFFLINE ERROR MESSAGE | | |

PRINTER SYSTEM, PRINTER, COMPUTER WITH PRINTER, PRINTING CONTROL METHOD, AND MEDIUM FOR RECORDING PRINTING CONTROL PROGRAM

BACKGROUND OF THE INVENTION

1. Field of the Invention

The present invention relates to a printer system, a printer, a computer connected to a printer, a printing control method, and a medium for recording a printing control program. In particular, the present invention relates to printing control, achieved by a computer, or a printer that is online to a computer. The present invention also relates to a printer system, a printer, a computer connected to a printer, and a printing control method that are capable of printing data in both one-way and two-way modes. The present invention further relates to a medium for recording a printing control program.

2. Description of the Related Art

Computers and, in particular, personal computers are usually connected to a printer through a parallel interface such as a Centronics interface. Conventionally, the parallel interface carries out one-way communication to transfer print data from a computer to a printer. The one-way communication allows the printer to transfer only simple information such as a busy status, an offline status, and an out-of-paper status to the computer. Even a computer connected to a printer through LAN having a two-way communication capability usually transmits print data to the printer in one-way communication.

IEEE (Institute of Electrical and Electronics Engineers) has standardized bidirectional parallel ports in IEEE-1284. Microsoft's Windows 95 (trademark) supports IEEE-1284 parallel ports as standard. In these circumstances, printers having a two-way communication capability are being developed. Communication protocols and application programs for realizing two-way communication through two-way parallel ports, however, have not been standardized yet, and therefore, printer manufacturers have to provide individual control techniques and services.

If a paper jam occurs in a printer, the two-way communication enables the printer to make a computer display a jam location and a way to solve the jam. The printer can also make the computer display a list of the sizes of sheets set in the printer and the remaining quantities of the sheets.

The two-way communication enables computers to precisely control printers with the use of many commands to start, send, stop, suspend, resume, and cancel print data.

The two-way communication is superior to one-way communication. Many printers that support two-way communication work only on Windows 95 but do not work on DOS or networks that support only one-way communication. There is an idea to provide a printer with both the one-way and two-way communication functions. Such a printer is semifixedly initialized to one of the functions and is difficult to switch between the two functions.

It is necessary to develop a printer having one-way and two-way modes and capable of easily switching the modes from one to another online. If the printer is connected to LAN that is connected to a computer with a one-way mode and a computer with a two-way mode, the printer must switch between the two modes online depending on the computer it communicates with.

To switch the mode of the printer to another, generally, a mode switching command is inserted into a printing sequence of the printer. In this way, however, the printer sequentially processes received data according to the printing sequence, and therefore, the switching command is processed only after preceding data held in a reception buffer of the printer is processed. If a printer error such as a sheet jam occurs in the one-way mode before issuing the switching command, the printer informs the computer of the error and puts itself in an offline state to accept no data from the computer. Then, the computer is unable to issue the switching command to the printer.

What is needed to solve these problems is a device capable of processing a mode switching command in real time prior to print data stored in a reception buffer of a printer and capable of temporarily putting the printer, which is in the one-way mode and is offline, in an online state to enable a computer to issue a mode switching command to the printer. Also needed is a device for returning the printer from the temporary online state to the original offline state.

SUMMARY OF THE INVENTION

An object of the present invention is to provide a printer system, a printer, a computer connected to a printer, and a printing control method that are capable of printing data in both one-way and two-way modes. Another object of the present invention is to provide a medium for recording a printing control program.

In order to accomplish the above objects, a first aspect of the present invention provides a computer to communicate with a printer. The computer has a mode setter, a one-way-communication controller, and a two-way-communication controller. The mode setter sets a one-way mode to establish communication with the printer through a transmission channel, or a two-way mode to establish communication with the printer through the transmission channel and a reception channel. If the mode setter sets the one-way mode, the one-way-communication controller sends print data to the printer only if the printer is online. If the mode setter sets the two-way mode, the two-way-communication controller sends a switching signal to the printer through a switching signal line irrespective of whether or not the printer is online. The switching signal is for switching the printer to the two-way mode and is a signal in response to which the printer can return a response to the computer through the reception channel. Upon receiving a response to the switching signal, the two-way-communication controller sends a command to switch the printer from the one-way mode to the two-way mode.

A second aspect of the present invention provides a printer having a one-way-communication controller for communicating with a computer through a transmission channel of the computer in a one-way mode, and a two-way-communication controller for communicating with the computer through the transmission channel and a reception channel of the computer in a two-way mode. The computer may send a switching signal through a switching signal line, to switch the printer to the two-way mode. This switching signal is a signal in response to which the printer can return a response to the computer through the reception channel even in an offline state in which the printer accepts no commands from the computer. Upon receiving the switching signal, the printer switches from the one-way mode to the two-way mode.

A third aspect of the present invention provides a printer system consisting of the computer of the first aspect and the printer of the second aspect.

A fourth aspect of the present invention provides a printing control method employed by a computer that communicates with a printer. The method sets the computer to a one-way mode or a two-way mode. If the computer is set to the one-way mode, the method sends print data from the computer to the printer only when the printer is online. If the computer is set to the two-way mode, the method sends a switching signal from the computer to the printer through a switching signal line. The switching signal is for switching the printer to the two-way mode and is a signal in response to which the printer can return a response to the computer through a reception channel irrespective of whether or not the printer is online. Once the computer receives such a response, the method makes the computer send a command to the printer to switch the printer from the one-way mode to the two-way mode. The method makes the printer receive the switching signal through the switching signal line even if the printer is offline, so that the printer may switch from the one-way mode to the two-way mode.

A fifth aspect of the present invention provides a medium for recording a printing control program that achieves the printing control method of the fourth aspect.

An operating system (OS) of a computer sets the computer, which communicates with a printer, to a one-way mode or a two-way mode. Depending on the mode set for the computer, the present invention switches the printer between the one-way mode and the two-way mode in real time. Even if the printer is in the one-way mode and is offline so that it is difficult for the computer to control the printer, the present invention can easily switch the printer to the two-way mode when the computer is set to the two-way mode. If it is necessary to return the printer to an offline state, the present invention easily returns the printer to an offline state.

BRIEF DESCRIPTION OF THE DRAWINGS

The above object and features of the present invention will be more apparent from the following description of preferred embodiments when read in conjunction with the accompanying drawings, wherein:

FIG. 5 shows an operation sequence of the embodiment in a one-way mode;

FIGS. 6A and 6B show an operation sequence of the embodiment in a two-way mode;

FIG. 7 shows an operation sequence of the embodiment in the two-way mode;

FIG. 11 shows an operation sequence of the prior art of FIG. 10.

DESCRIPTION OF THE PREFERRED EMBODIMENTS

For a better understanding of the preferred embodiments of the present invention, the problems of the prior arts will be explained with reference to FIGS. 9 to 11.

Figure 9:
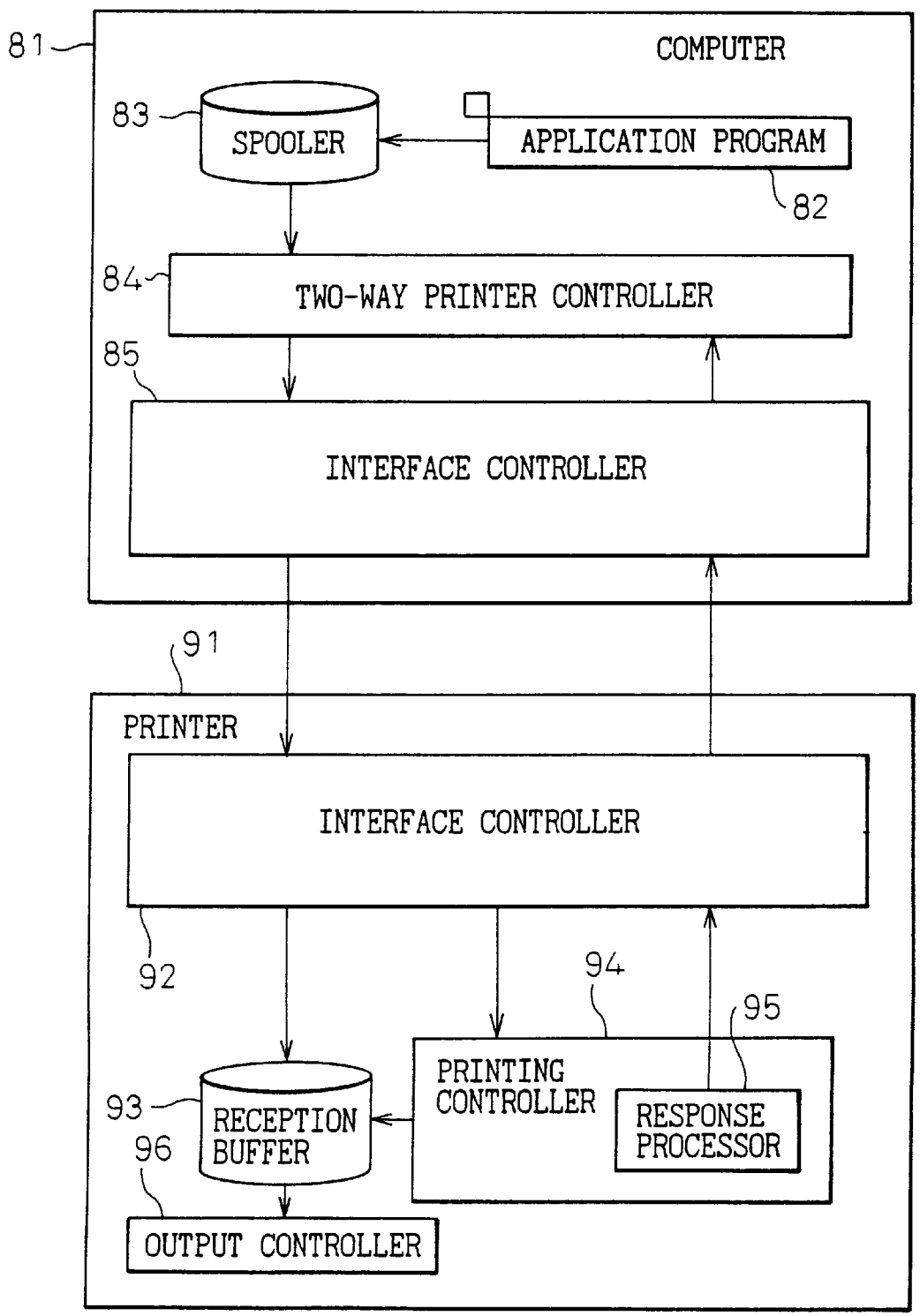
FIG. 9 shows a two-way printer system according to a prior art.

FIG. 9 shows a two-way printer system according to a prior art.

The system includes a computer 81 and a printer 91 that is online to the computer 81.

The computer 81 has an application program 82 for providing print data, a spooler 83 for holding the print data, a two-way printer controller 84 for controlling the printer 91 in two-way communication, and an interface controller 85 for controlling an interface with the printer 91.

The printer 91 has an interface controller 92 for controlling an interface with the computer 81, a reception buffer 93 for holding print data, and a printing controller 94. The printing controller 94 analyzes commands from the computer 81, carries out two-way communication with the computer 81, and controls printing. The printer 91 further has a response processor 95 for returning responses to the computer 81, and an output controller 96 for controlling print output.

The operation of the system of FIG. 9 will be explained.

The application program 82 prepares print data, which is stored in the spooler 83. The two-way printer controller 84 issues a two-way-communication start command to the interface controller 85, which transfers the command to the interface controller 92 of the printer 91.

The interface controller 92 transfers the command to the printing controller 94, which checks to see if two-way communication printing is possible. According to a result of the checking, the printing controller 94 instructs the response processor 95 to prepare a response indicating whether or not the printer is ready. The response processor 95 transfers the response to the interface controller 92.

The interface controller 92 transfers the response to the interface controller 85 of the computer 81, which transfers the response to the two-way printer controller 84. The controller 84 analyzes the response, and if the printer 91 is ready for two-way communication printing, fetches the print data from the spooler 83 and transfers it to the interface controller 85. The interface controller 85 transmits the print data to the interface controller 92, which stores the print data in the reception buffer 93 under the control of the printing controller 94. The output controller 96 outputs for printing the print data stored in the reception buffer 93.

Figure 10:
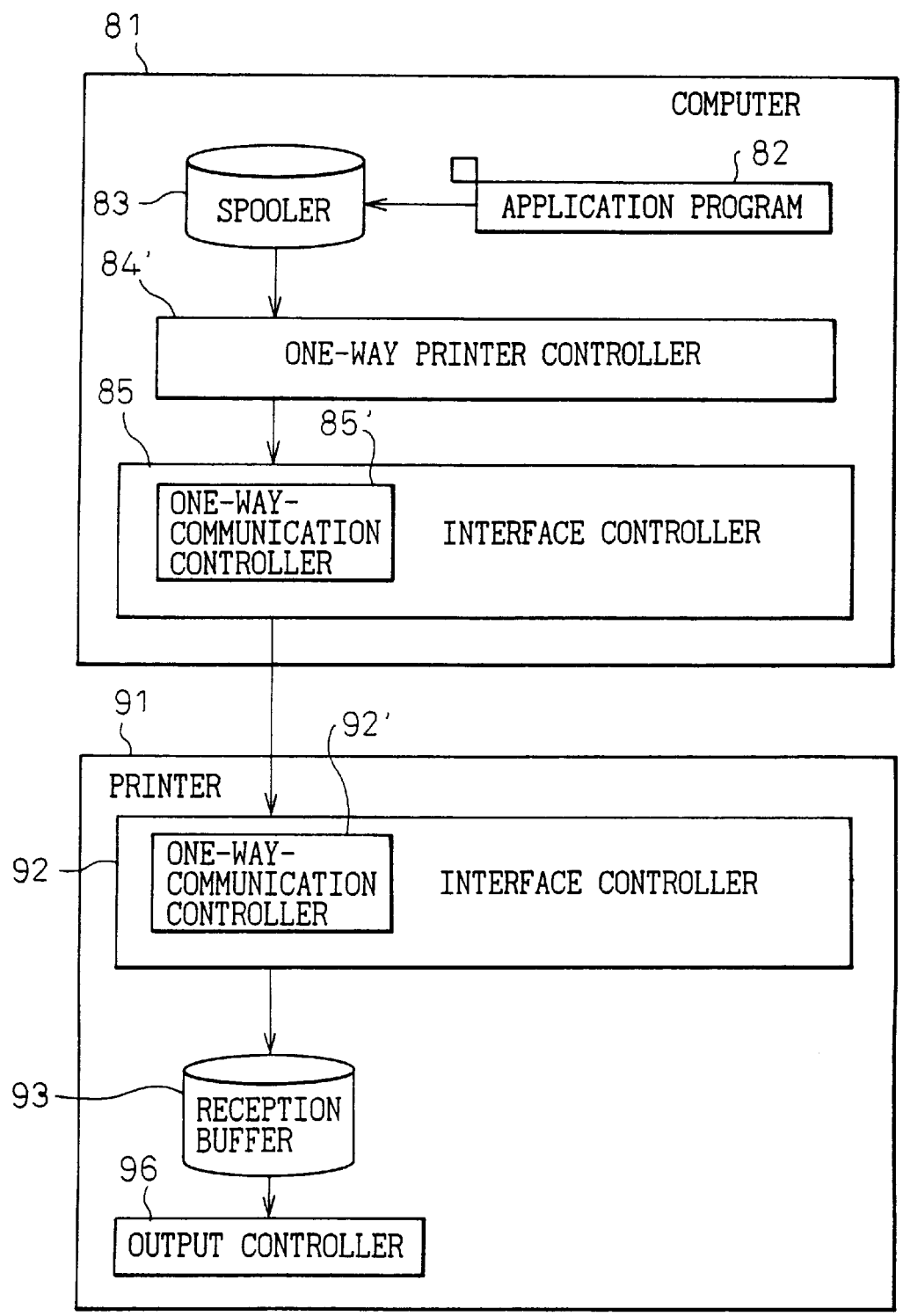
FIG. 10 shows a one-way printer system according to a prior art.

FIG. 10 shows a one-way printer system according to a prior art.

A one-way printer controller 84' of a computer 81 carries out one-way printing communication with a printer 91. A one-way-communication controller 85' of the computer 81 carries out one-way communication with the printer 91. A one-way-communication controller 92' of the printer 91 handles one-way communication.

The printer 91 has no printing controller 94 nor response processor 95 of FIG. 9. Other parts of FIG. 10 are the same as those of FIG. 9.

The operation of the system of FIG. 10 will be explained.

An application program 82 provides print data, which is stored in a spooler 83. The one-way printer controller 84' creates a print start command and transfers it with the print data to an interface controller 85. The one-way-communication controller 85' transmits the command and print data to the printer 91. The one-way-communication controller 92' of the printer 91 analyzes the command as well as a printer status and returns a busy response, a ready response, a printer offline response, etc., to the computer 81.

If the printer 91 is ready for printing, the print data from the computer 81 is transferred to a reception buffer 93 under the control of the one-way-communication controller 92'. An output controller 96 outputs the print data from the reception buffer 93.

FIG. 11 shows an operation sequence of the prior art of FIG. 9 in the one-way mode. The printer is offline.

(1) The one-way printer controller 84' of the computer 81 calls a function Open() to instruct the interface controller 85 to start a print job.

(2) The printer controller 84' calls a function Write(data) to fetch print data from the spooler 83 and write it into a port of the interface controller 85. The printer 91 is offline in this example, and therefore, the printer controller 84' is unable to write the print data into the port. This causes an error.

(3) The computer 81 displays, on a display, an error message that the printer is offline.

In this way, the computer and printer of the prior arts are fixed to one of the one-way and two-way modes. It is impossible for the prior arts to switch these modes from one to another depending on the situation.

Next, preferred embodiments of the present invention will be explained.

Figure 1:
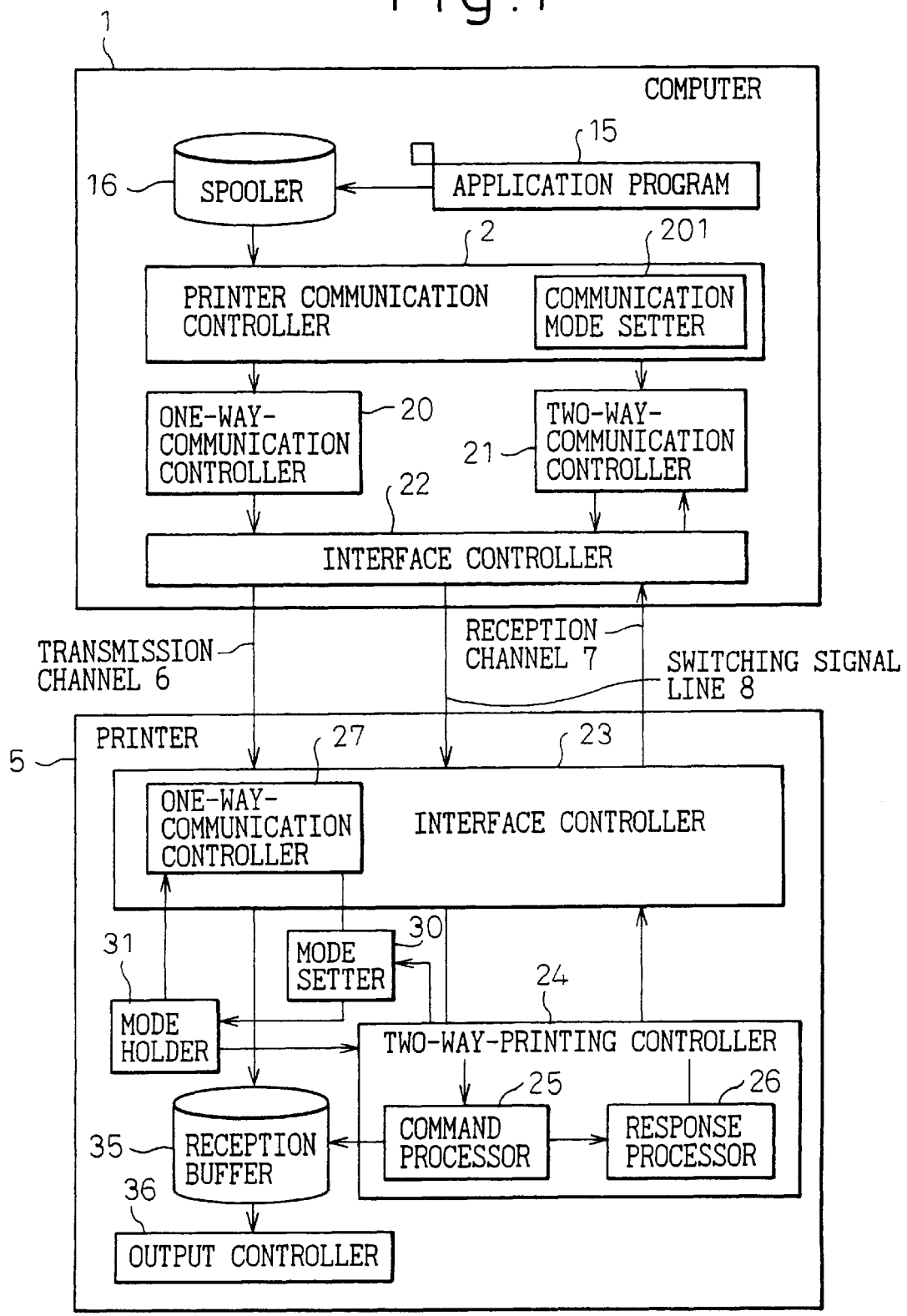
FIG. 1 shows a printer system having a computer and a printer according to an embodiment of the present invention.

FIG. 1 shows a printer system according to an embodiment of the present invention.

The system has a computer 1 and a printer 5 that is connected to the computer 1 through a transmission channel 6, a reception channel 7, and a switching signal line 8.

The computer 1 has an application program 15 for creating print data, a spooler 16 for storing the print data as a file, a printer communication controller 2 for receiving the print data from the spooler 16 and controlling one-way or two-way communication with the printer 5, a one-way-communication controller 20, a two-way-communication controller 21, and an interface controller 22.

The printer communication controller 2 has a communication mode setter 201 for setting the computer 1 to a one-way mode or a two-way mode through an operating system (OS) which is not illustrated in the figure.

The printer communication controller 2 controls the one-way-communication controller 20 if the operating system of the computer 1 is set to the one-way mode, and the two-way-communication controller 21 if the operating system of the computer 1 is set to the two-way mode.

In response to a switching signal from the computer 1, the printer 5 switches between the one-way mode and the two-way mode. The printer 5 has an interface controller 23, a two-way-printing controller 24, a mode setter 30, a mode holder 31, a reception buffer 35, and an output controller 36.

The interface controller 23 has a one-way-communication controller 27.

The two-way-printing controller 24 has a command processor 25 and a response processor 26.

The application program 15 of the computer 1 is a user program that provides the spooler 16 with print data. The spooler 16 holds the print data as a file. The OS (not shown) activates the printer communication controller 2, which supports the one-way and two-way modes. The printer communication controller 2 uses the two-way-communication controller 21 for printers that are operable in the two-way mode, and uses the one-way-communication controller 20 for printers that are operable only in the one-way mode or printers that are operable in the two-way mode but are initialized not to work in the two-way mode.

Figure 2:
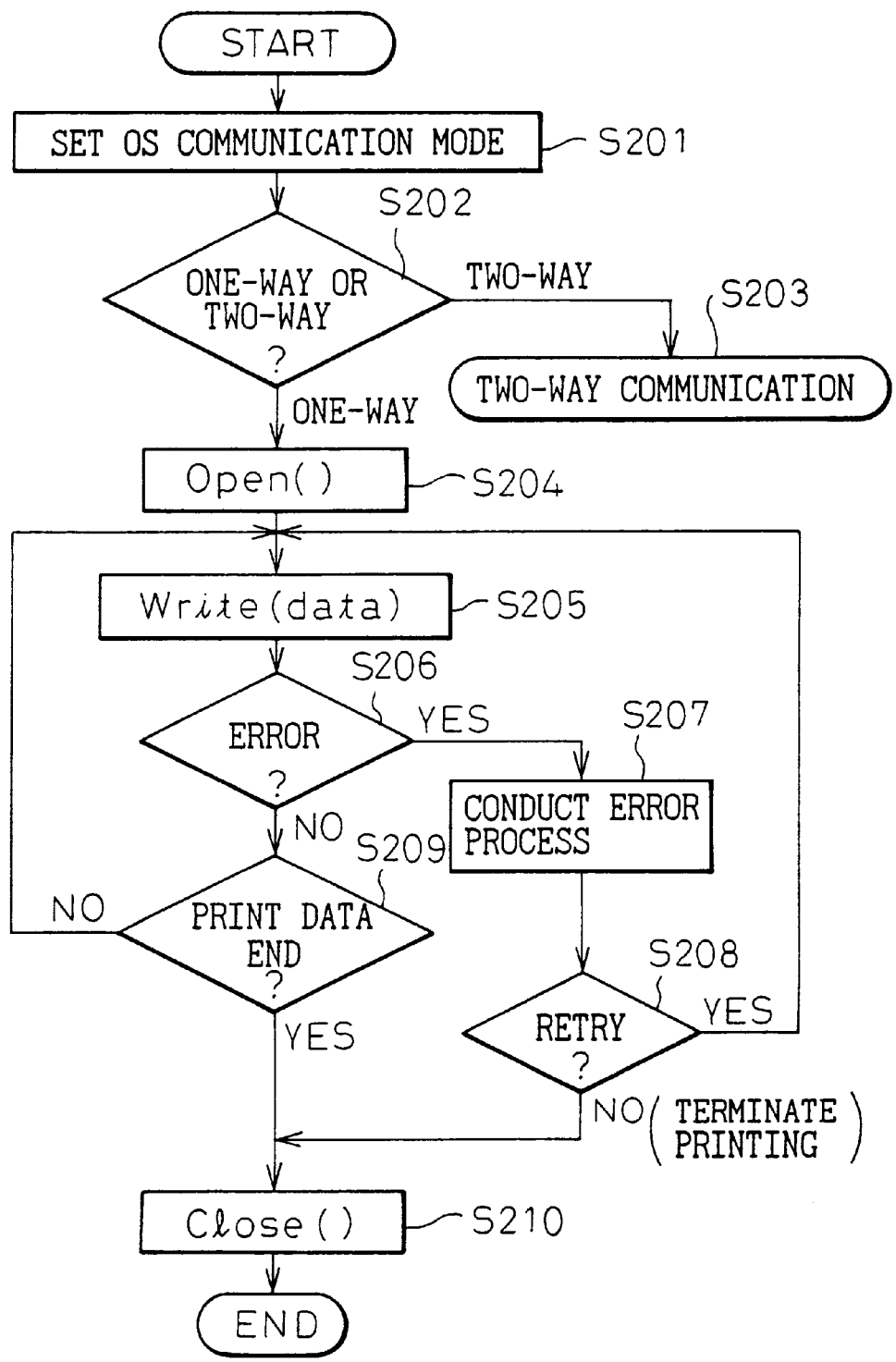
FIG. 2 is a flowchart explaining the operation of the system shown in FIG. 1.

FIG. 2 is a flowchart showing the operation of the printer system of FIG. 1.

In step S201, the mode setter 201 of the computer 1 sets the communication mode of the OS to one of the one-way and two-way modes. In step S202 it is detected whether the communication mode is the one-way mode or the two-way mode. If it is the two-way mode, in step S203, two-way communication is carried out according to the present invention. If it is the one-way mode, in step S204, conventional one-way communication is carried out.

In step S204 of the one-way mode, the printer communication controller 2 calls a function Open() to instruct the one-way-communication controller 20 to start a print job. In step S205, a function Write(data) is called to transfer print data from the spooler 16 to the interface controller 22, which transmits the print data to the printer 5 through the transmission channel 6. In step S206, the printer 5 is checked to see if there is an error or a busy state. The error or busy state occurs if the printer 5 is offline because there are no sheets in the printer 5 or when there is a sheet jam in the printer 5. Then, in step S207, an error process of, for example, making the printer 5 online is carried out. In step S208, it is checked to see if the print data transmission must be retried. If it must be retried, step S205 is repeated, and if not, in step S210, a function Close() is called to make the printer communication controller 2 terminate the print job.

If it is determined in step S206 that there is no error, in step S209, it is checked to see if all print data has been transferred to the interface controller 22. If so, in step S210, the printer communication controller 2 finishes the print job. In this way, if the printer 5 is normal and ready for printing in the one-way mode, the one-way-communication controller 20 of the computer 1 and the one-way-communication controller 27 of the printer 5 control print data so that it is stored in the reception buffer 35 of the printer 5. The print data in the reception buffer 35 is sequentially processed by the output controller 36 and is printed.

Figure 3:
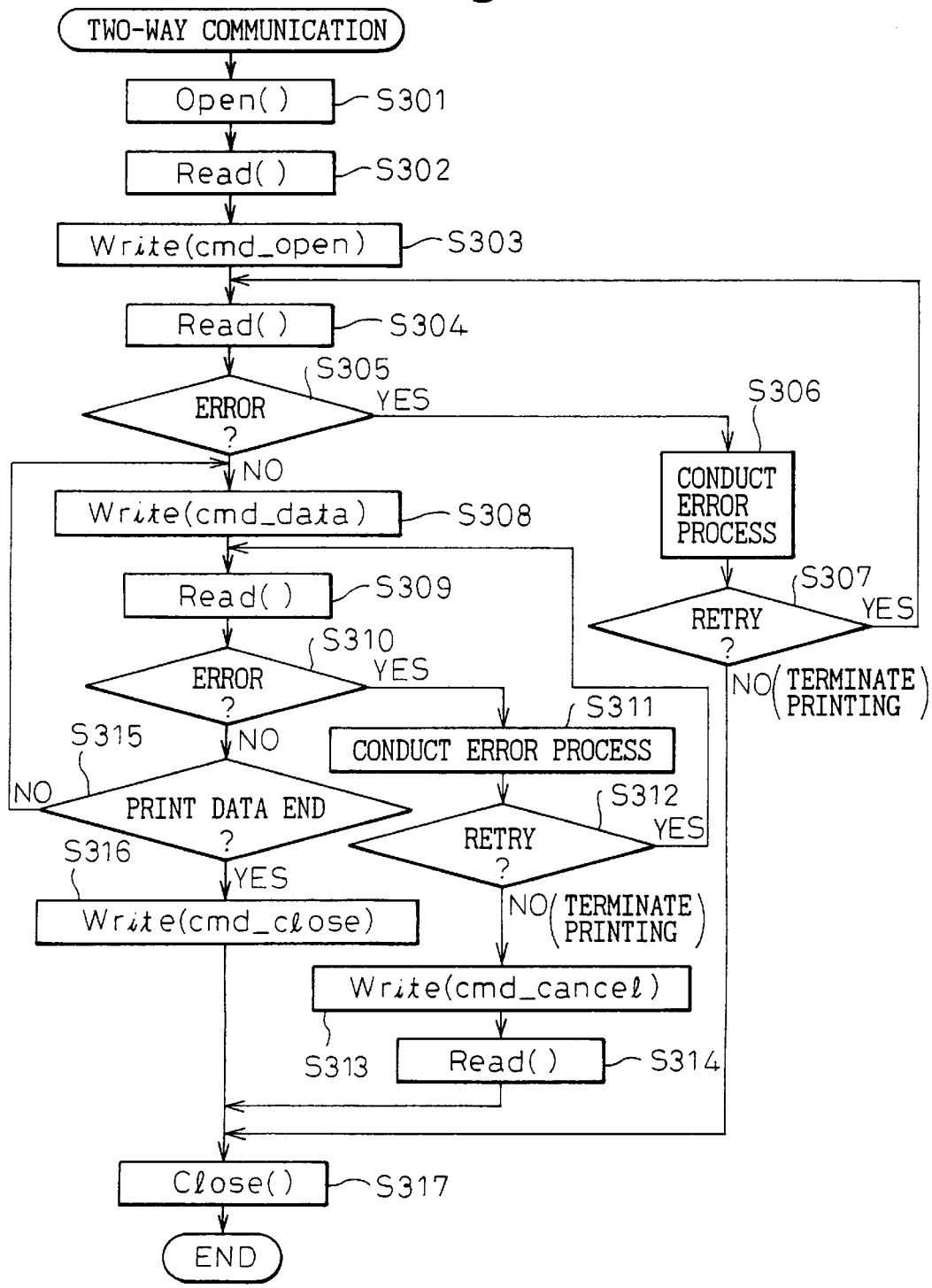
FIG. 3 is a flowchart showing the details of step S203 of FIG. 2.

FIG. 3 is a flowchart showing the details of step S203 of FIG. 2. In step S301 corresponding to step S204 of FIG. 2, a function Open() is called. In step S308 corresponding to step S205 of FIG. 2, a function Write(cmd, data) is called. In step S317 corresponding to step S210 of FIG. 2, a function Close() is called.

According to the present invention, step S302 for a function Read() and step S303 for a function Write(cmd-open) are inserted between the function Open() of step S301 and the function Write(cmd, data) of step S308. Also, steps S309 to S316 are inserted between the function Write(cmd, data) of step S308 and the function Close() of step S317.

In the same sequence as that of the one-way mode, the two-way-communication controller 21 receives the functions Open() in step S301, Write(cmd, data) in step S308, and Close() in step S317. After receiving the function Open() in step S301, the two-way-communication controller 21 executes the functions Read(), Write(cmd-open), and Read() in steps S302 to S304. After the function Write(cmd, data) in step S308, the two-way-communication controller 21 executes the functions Read() and Write in steps S309 to S316.

The parentheses "()" in the expressions Open(), Close(), Read(), and Write() indicate input parameters for the functions. If there is noting between the parentheses "()," the function in question has no input parameters.

The function Write() must have write data as input parameters so that the function may write print data or a command.

The functions Open() and Close() are internal functions to acquire and release a port, and therefore, need no input parameters. The function Read() is to read a printer status and needs input parameters for specifying a memory area to receive the printer status. In the flowchart, these input parameters are omitted.

In step S301, the printer communication controller 2 calls the function Open() to make the two-way-communication controller 21 start a print job and acquire an input port thereof.

In response to the function Open(), the controller 21 carries out the functions Read(), Write, and Read() in steps S302 to S304. More precisely, to prepare for issuing a command "cmd-open" to start two-way communication, the controller 21 makes a request (Read) for the interface controller 22 to acquire a printer status in step S302. The request Read is transmitted to the interface controller 23 of the printer 5 through the switching signal line 8.

In response to the request Read, the interface controller 22 reads the status of the printer 5.

The printer status reading operation will be explained. The printer 5 is initialized to the one-way mode. Upon receiving the request Read through the switching signal line 8, the interface controller 23 of the printer 5 is switched to the two-way mode and requests the command processor 25 for a printer status. Even if the transmission channel 6 is offline due to a shortage of paper or a jam in the printer 5, the request Read can be sent from the computer 1 to the printer 5 through the switching signal line 8.

The switching signal transmitted through the switching signal line 8 is not limited to the request signal Read. Any signal may be used as the switching signal as long as the signal can be received by the printer 5 even if the printer 5 is offline and as long as the printer 5 can return a response to the computer 1 in response to the signal.

The two-way-command processor 25 requests the response processor 26 to prepare a printer status, and then, switches the one-way mode to a pseudo two-way mode to wait for the command "cmd-open" to start two-way communication. The mode setter 30 sets in the mode holder 31 a flag indicating the pseudo two-way mode. In response to the request from the command processor 25, the response processor 26 prepares a printer status and requests the interface controller 23 to transmit it. In response to the request, the interface controller 23 transmits the printer status to the interface controller 22 of the computer 1, which transfers it to the two-way-communication controller 21.

The controller 21 analyzes the printer status and determines whether or not the printer 5 is ready. If the printer 5 is ready, the controller 21 prepares the command "cmd-open" to start two-way communication in step S303 and requests the interface controller 22 to transmit the command (Write). After the request Write is correctly processed by the interface controller 22, the controller 21 requests, in step S304, the interface controller 22 to acquire (Read) a response (status) to the command.

If the printer 5 provides no response to the request Read made in step S304, step S305 determines that the printer 5 has an error. In step S306, an error process is carried out to, for example, make the printer 5 online. In step S307, a check is effected to see if the response acquiring step must be retried. If it must be retried, step S304 is repeated.

In step S305, if it is determined that the printer 5 has no error, the interface controller 22 transmits the command according to the request Write from the two-way-communication controller 21. The command is passed to the command processor 25 through the interface controller 23 of the printer 5. The command processor 25 analyzes the command. If it agrees with the command "cmd-open" to start two-way communication, the command processor 25 requests the response processor 26 to make a response to the command "cmd-open." At the same time, the command processor 25 switches the pseudo two-way mode to the two-way mode, and the mode setter 30 stores in the mode holder 31 a flag indicating the two-way mode. In step S309, the response processor 26 prepares a response according to the request from the command processor 25 and requests the interface controller 23 to transmit (Read) the response. The response is passed through the interface controllers 23 and 22 to the controller 21 of the computer 1.

If the printer 5 transmits no response, it is determined that the printer 5 has an error such as an offline error. Then, in step S311, an error process is carried out to, for example, make the printer 5 online. Step S312 checks to see if the response sending request must be retried. If it must be retried, step S309 is repeated.

Thereafter, steps S308 to S315 and, in particular, steps S308 and S309 are repeated to transfer control commands with print data and responses with printer status between the computer 1 and the printer 5. If necessary, step S313 cancels the print job. Print data is transferred as part of a control command to the command processor 25. The command processor 25 separates the print data from the command and stores the print data in the reception buffer 35. At the same time, the command processor 25 requests the response processor 26 to issue a response. The print data in the reception buffer 35 is sequentially processed by the output controller 36. Even if the printer 5 is receiving data in the one-way mode, the printer 5 may be switched to the two-way mode to receive new print data while the output controller 36 is outputting print data received in the one-way mode.

In step S315, if it is determined that all print data has been transferred to the printer 5 and a print completion status has been received, the two-way-communication controller 21 of the computer 1 prepares, in step S316, a control command "cmd-close" to end two-way communication and requests (Write) the interface controller 22 to send the command. After the request Write is correctly processed, the command "cmd-close" is passed through the interface controllers 22 and 23 to the command processor 25 of the printer 5. The command processor 25 switches the two-way mode to the one-way mode. The mode setter 30 sets in the mode holder 31 a flag indicating the one-way mode. This completes the print job.

Figure 4A:
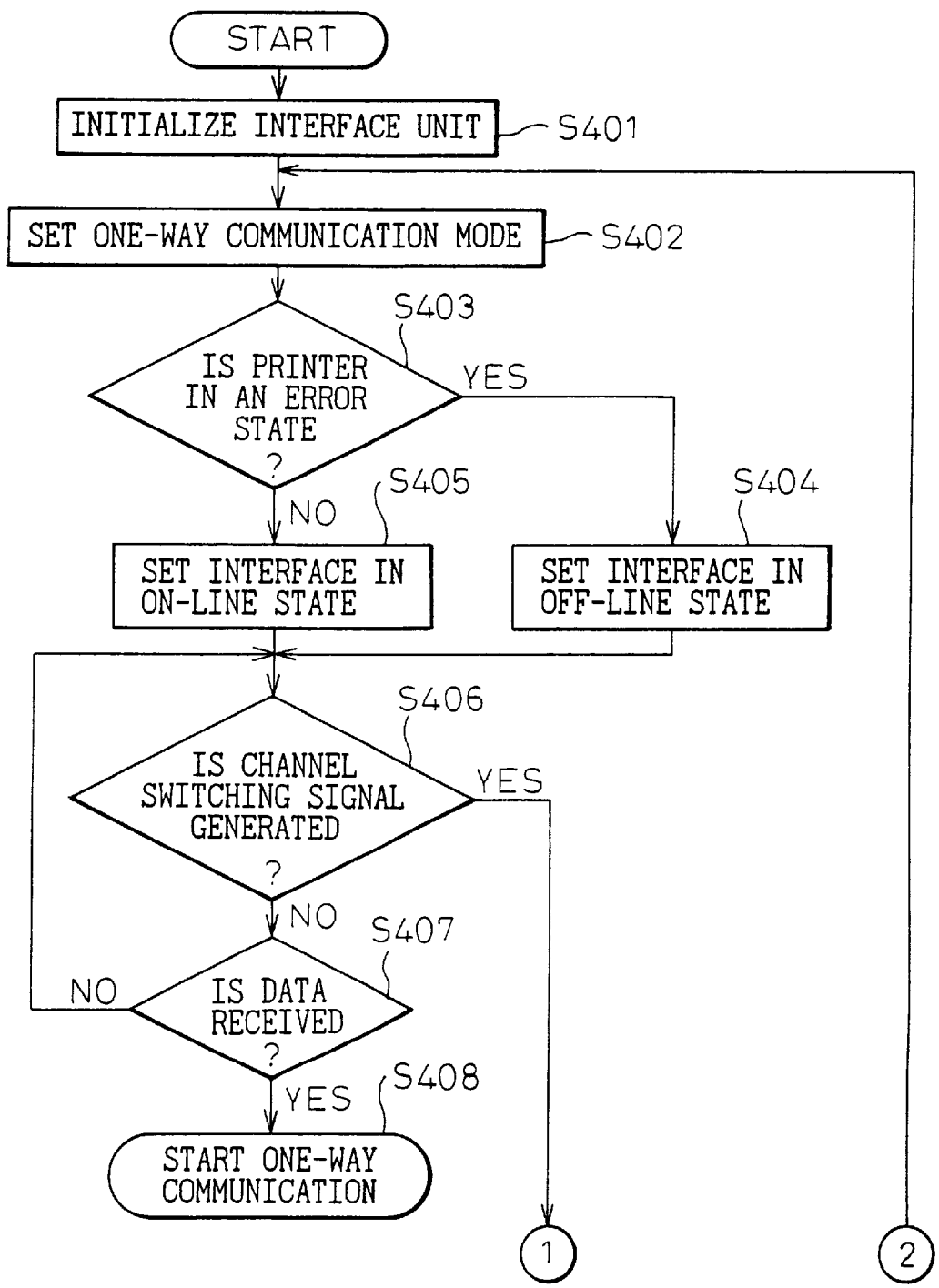
FIG. 4A and FIG. 4B are a flowchart showing the operation of the printer shown in FIG. 1.
Figure 4B:
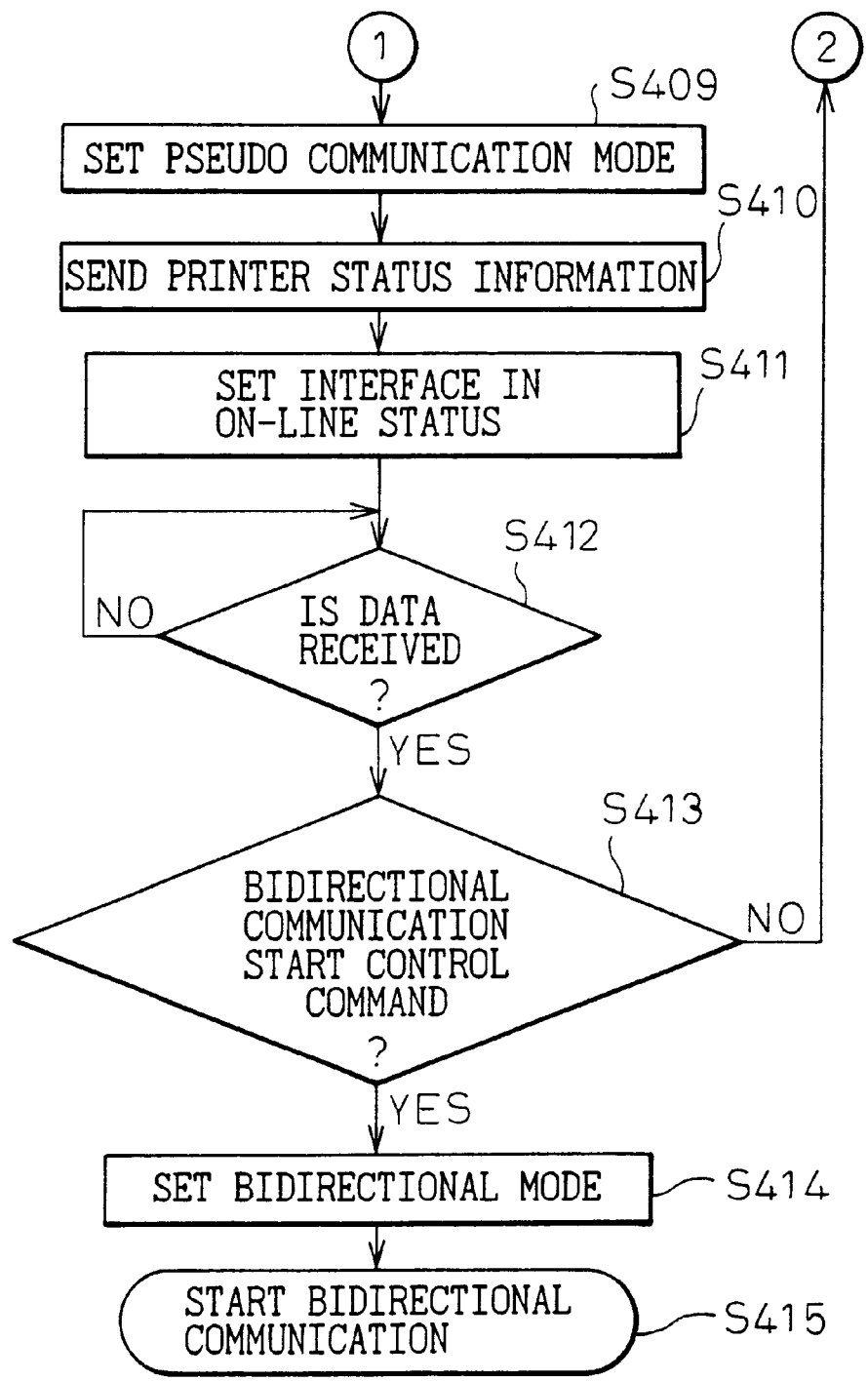

FIGS. 4A and 4B are flowchart showing the operation of the printer 5. In step S401, the interface 23 is initialized. In step S402, the interface 23 is set to be the one-way mode. Then in step S403, it is checked whether the printer 5 is in an error state such as a shortage of paper or a jam in the printer 5. If the printer 5 is in an error state, in step S404, the interface 23 is set to an off line status. If the printer 5 is not in an error state, in step S405, the interface 23 is set to an on-line status. Then in step S406, it is checked whether the channel switching signal is being generated. If the channel switching signal is not being generated, and if data is received in step S407, the one-way communication is started. If data is not received in step S407, the process returns to step S406.

In step S406, if it is determined that the channel switching signal is generated, then, in step S409, the two-way command processor 25 is set to be in the pseudo two-way-communication mode. Then in step S410, the printer status information is sent from the interface 23 to the computer 1.

Then, in step S411, the interface 23 is set to an on-line status and if data is received in step S412, it is determined whether the received data is the two-way communication start command. If it is not the two-way communication start command, the process returns to step S402. If the two-way communication start command is received, in step S414, the two-way command processor 25 is set to be in the two-way communication mode, and the two-way communication is started in step S415.

FIG. 5 shows an operation sequence of the printer system of FIG. 1 in the one-way mode (FIG. 2). In this example, the printer 5 is normal and online. The operation of the printer system in the one-way mode is the same as that of the prior art which fixes the printer to the one-way mode. The operation sequence of FIG. 5 will be explained.

(1), (1)': The printer communication controller 2 calls the function Open() to instruct the interface controller 22 to start a print job (step S204 of FIG. 2).

(2), (3): The printer communication controller 2 transfers print data from the spooler 16 to the interface controller 22 with the function Write(data) for the one-way-communication controller 20 (step S205 of FIG. 2).

(4), (5): The one-way-communication controller 20 receives the print data from the printer communication controller 2 and writes the same into a port of the interface controller 22, so that the print data is transferred to the printer 5.

(6): The printer 5 stores the received print data in the reception buffer 35 and the output controller 36 outputs the same for printing.

(7): The printer communication controller 2 writes print data into the interface controller 22 with the function Write (data) (step S205 of FIG. 2).

(8), (9): The interface controller 22 transmits the received print data to the printer 5.

Until all print data is transmitted to the printer 5, the printer communication controller 2 repeats the writing of print data into the interface controller 22 with the function Write(data), and the interface controller 22 repeats the transmission of the print data to the printer 5.

(10), (11): The printer communication controller 2 calls the function Close() to instruct the interface controller 22 to terminate the transmission of print data (step S210 of FIG. 2).

Figure 6B:
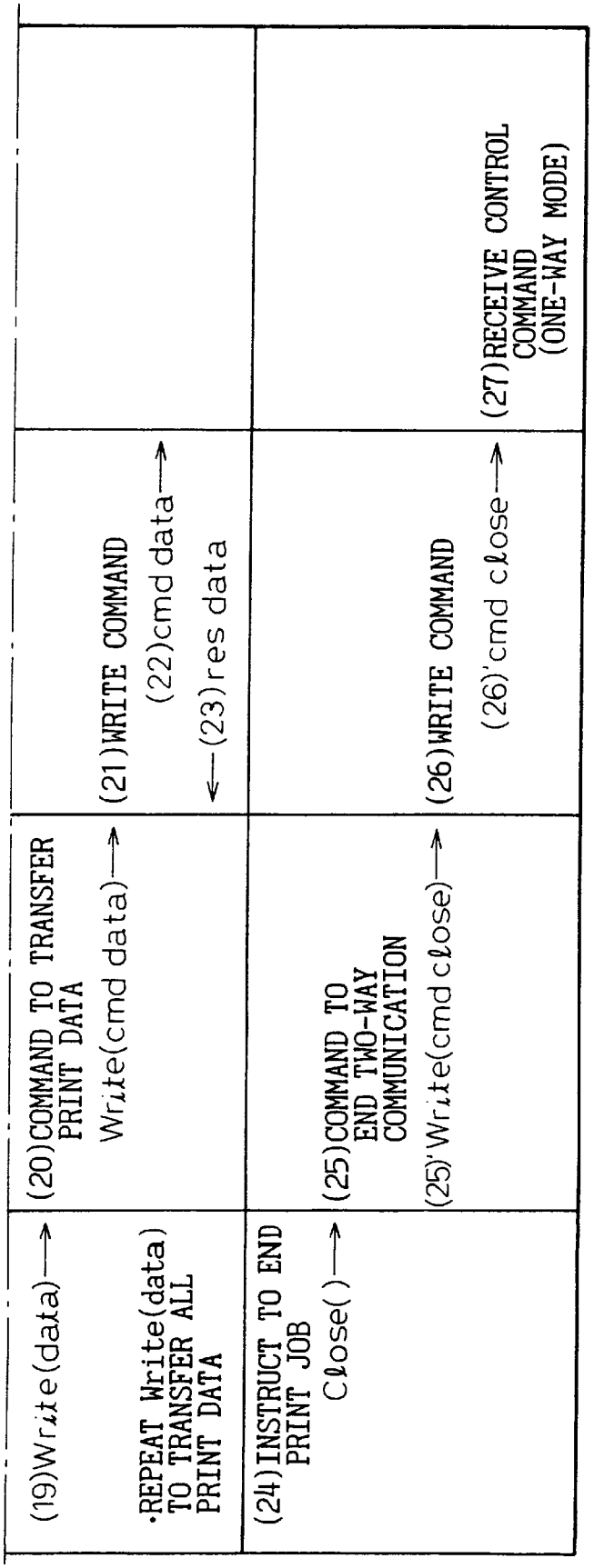

FIGS. 6A and 6B show an operation sequence of the printer system of FIG. 1 in the two-way mode (FIG. 3). The printer 5 is online and normal.

At first, the printer 5 is in the one-way mode. The sequence of FIGS. 6A and 6B will be explained.

(1), (1)', (1)": The printer communication controller 2 calls the function Open() to instruct the two-way-communication controller 21 to start a print job. The controller 21 calls the function Open() to instruct the interface controller 22 to start the print job (step S301 of FIG. 3).

(2), (3): The controller 21 calls the function Read() to instruct the interface controller 22 to request for the status of the printer 5 (step S302 of FIG. 3).

(4): The interface controller 22 reads the status of the printer 5.

(5): The printer 5 sends the status to the interface 22. The printer 5 is set to the pseudo two-way mode.

(6): The interface controller 22 informs the controller 21 of the received status.

(7), (7)': The controller 21 issues a command "cmd-open" to start two-way communication and calls the function Write(cmd-open) to instruct the interface controller 22 to write the command (step S303 of FIG. 3).

(8), (9): The interface controller 22 writes the command "cmd-open" and transmits it to the printer 5.

(10), (11): The printer 5 receives the command "cmd-open" and returns a response "res-open." The printer 5 switches from the pseudo two-way mode to the two-way mode.

(12): The interface controller 22 receives the response "res-open" and transfers it to the controller 21.

(13): The printer communication controller 2 calls the function Write(data) to transfer print data to the controller 21 (step S308 of FIG. 3).

(14), (14)': The controller 21 issues a command "cmd-data" to transfer the print data to the interface controller 22 with the function Write(cmd, data).

(15), (15)': The interface controller 22 writes the command "cmd-data" and print data into a port thereof and transmits them to the printer 5.

(16), (17): The printer 5 receives the command "cmd-data" and print data, separates the print data, and writes it into an end area of the reception buffer 35. Then, the printer 5 returns a response "res-data" to the interface controller 22.

(18): The interface controller 22 transfers the response "res-data" to the controller 21.

(19): The printer communication controller 2 calls the function Write(data) to transfer print data to the controller 21 (step S308 of FIG. 3).

(20): The controller 21 issues a command "cmd-data" to transfer the print data and calls the function Write(cmd, data) to instruct the interface controller 22 to transmit the print data and command "cmd-data" to the printer 5.

(21), (22): The interface controller 22 writes the command "cmd-data" and print data into a port thereof and transmits the print data and command to the printer 5. The printer 5 separates the print data from the command, writes the print data into the reception buffer 35, and returns a response "res-data" to the interface controller 22 of the computer 1.

(23): The interface controller 22 transfers the response "res-data" to the controller 21.

Until all print data is transmitted from the computer 1 to the printer 5, the function Write(data) of step S308 of FIG. 3 is repeated.

(24): After all print data is transmitted to the printer 5 (step S315 of FIG. 3), the printer communication controller 2 calls the function Close() to instruct the controller 21 to end the print job (step S317 of FIG. 3).

(25), (25)': The controller 21 issues a command "cmd-close" to end two-way communication and transmits it to the interface controller 22 with the function Write(cmd-close).

(26), (26)': The interface controller 22 writes the command "cmd-close" to a port thereof and transmits the command to the printer 5.

(27): In response to the command "cmd-close", the printer 5 terminates the two-way mode and resumes the one-way mode.

FIG. 7 shows an operation sequence of the printer system of FIG. 1 in the two-way mode. In this example, the printer 5 is offline, and a printing process is continuously executed.

(1), (1)', (1)": The printer communication controller 2 calls the function Open() to instruct the two-way-communication controller 21 to start a print job. The controller 21 calls the function Open() to instruct the interface controller 22 to start the print job.

(2), (3): The controller 21 calls the function Read() to instruct the interface controller 22 to request for the status of the printer 5.

(4): The interface controller 22 reads the status of the printer 5.

(5): The printer 5 transmits a status indicating that the printer 5 is offline, to the interface controller 22 of the computer 1 through the reception channel 7. The printer 5 is set to the pseudo two-way mode.

(6): The interface controller 22 transfers the status to the controller 21.

(7): The controller 21 displays an error message that the printer 5 is offline on the display (not shown).

(8): The controller 21 issues a command "cmd-open" to start two-way communication and calls the function Write (cmd-open) to instruct the interface controller 22 to write the command (step S303 of FIG. 3).

(9): The interface controller 22 writes the command "cmd-open" and transmits the same to the printer 5.

(10), (11): The printer 5 receives the command and returns a response "res-open" to the interface controller 22. The printer 5 is switched from the pseudo two-way mode to the two-way mode.

(12): The interface controller 22 transfers the response "res-open" to the controller 21.

Then, the error state of the printer 5 is released and the printer communication controller 2 transfers print data to the interface controller 22 which transmits the print data to the printer 5. These operations are the same as those of FIGS. 5A and 5B.

Figure 8:
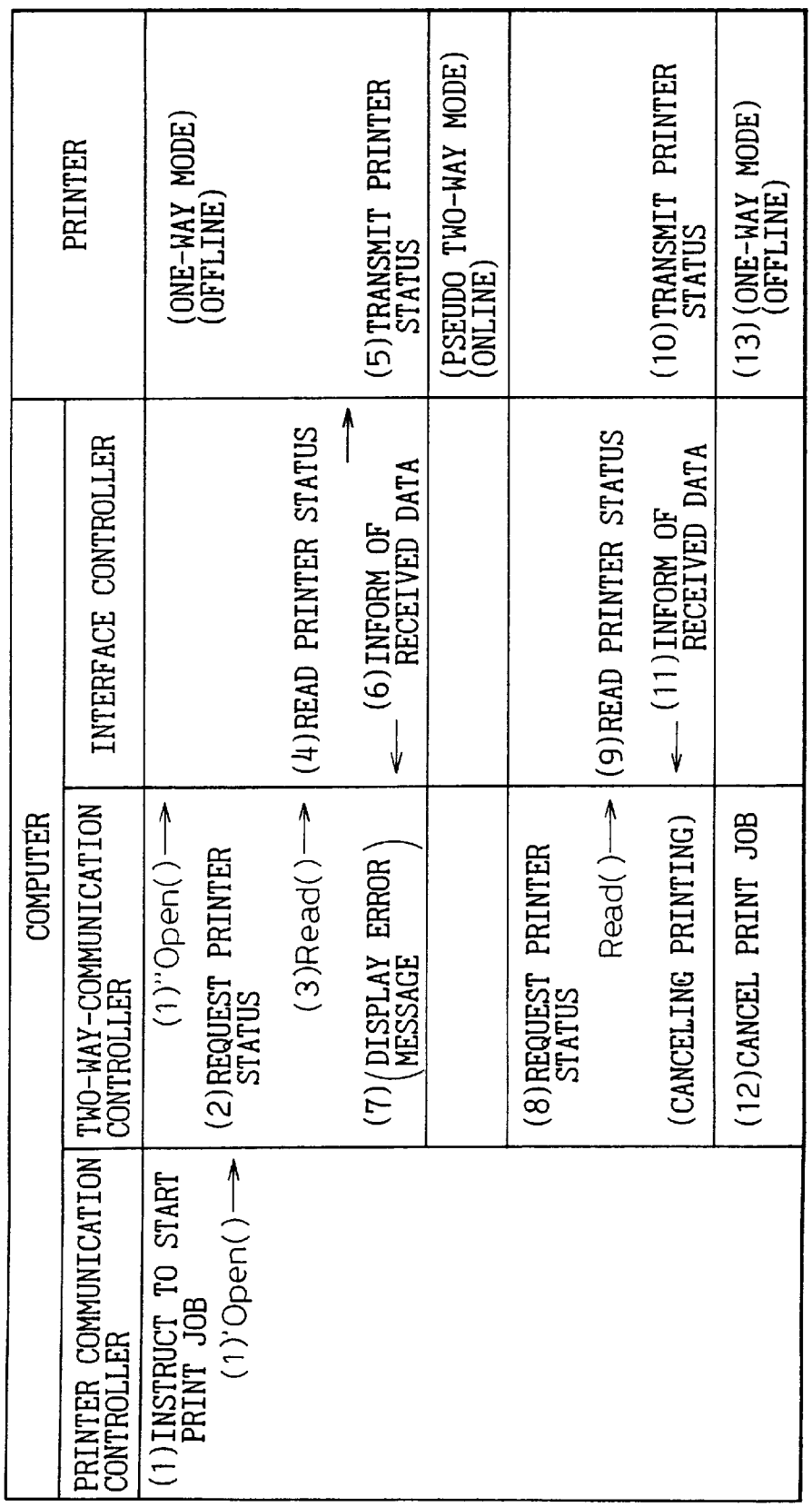
FIG. 8 shows an operation sequence of the embodiment in the two-way mode.

FIG. 8 shows an operation sequence of the printer system of FIG. 1 in the two-way mode. In this example, the printer 5 is offline and a print job is cancelled.

(1), (1)', (1)": The printer communication controller 2 calls the function open() to instruct the two-way-communication controller 21 to start a print job. The controller 21 calls the function Open() to instruct the interface controller 22 to start the print job (step S301 of FIG. 3).

(2), (3): The controller 21 calls the function Read() to instruct the interface controller 22 to get a printer status (step S302 of FIG. 3).

(4): The interface controller 22 makes a request for reading the status of the printer 5 through the switching signal line 8.

(5): The printer 5 transmits a status indicating that the printer 5 is offline, to the interface controller 22 of the computer 1 through the reception channel 7. The printer 5 is switched to the pseudo two-way mode.

(6): The interface controller 22 informs the controller 21 of the received printer status.

(7): The controller 21 displays an error message that the printer 5 is offline on the display.

(8): The controller 21 calls the function Read() for the interface controller 22 (step S309 of FIG. 3). This is a preparation for canceling the print job and returning the printer 5 from the pseudo two-way mode to the one-way mode.

(9): The interface controller 22 reads the status of the printer 5.

(10): The printer 5 transmits the status (offline) to the interface controller 22 through the reception channel 7.

(11): The interface controller 22 transfers the received status to the controller 21.

(12): The controller 21 cancels the print job.

(13): The printer 5 returns to the one-way mode because no command to start two-way communication is received.

As explained above, the present invention is capable of switching, in real time, the mode of a printer between one-way and two-way modes according to a mode set in a computer that is connected to the printer. If the printer is offline so that the computer cannot control the printer, the present invention uses a switching signal to easily switch the printer to the two-way mode. If it is preferable to return the printer to the original offline state, the present invention uses the switching signal to easily return the printer to the original offline state.

The present invention enables the computer to easily acquire the state of the printer online, to thereby improve online printing efficiency.

Even if the printer is offline due to some error, the present invention uses the switching signal to set the printer to the two-way mode and make the printer receive print instructions. As a result, the printer may automatically start printing as soon as the error is corrected.

Although the present invention has been disclosed and described by way of embodiments, it is apparent to those skilled in the art that other embodiments and modifications of the present invention are possible without departing from the spirit or essential features thereof.

What is claimed is:

1. A processing apparatus to communicate with an image forming apparatus, comprising:

a mode setting unit for setting one of a one-way mode to establish communication between the processing apparatus and the image forming apparatus through a transmission channel and a two-way mode to establish communication between the processing apparatus and the image forming apparatus through the transmission channel and a reception channel;

a one-way-communication control unit for sending data to the image forming apparatus if the mode setting unit sets the one-way mode and if the image forming apparatus is online; and a two-way-communication control unit for sending, if the mode setting unit sets the two-way mode, a switching signal to the image forming apparatus through a switching signal line irrespective of whether or not the image forming apparatus is online, the switching signal being used for switching the image forming apparatus to the two-way mode and being a signal in response to which the image forming apparatus can return a response to the processing apparatus through the reception channel, upon receiving a response to the switching signal, the two-way-communication control unit issuing a command to switch the image forming apparatus from the one-way mode to the two-way mode, wherein the image forming apparatus is switched from the one-way mode to a pseudo two-way mode after a response to the switching signal is returned, the pseudo two-way mode being a temporary online state in which the image forming apparatus can receive commands from the processing apparatus;

the two-way-communication control unit issues a command to start two-way communication from the pseudo two-way mode if so required; and the two-way-communication control unit issues a command other than the command to start two-way communication if the image forming apparatus must be returned to the one-way mode from the pseudo two-way mode without starting two-way communication.

2. The processing apparatus of claim 1, wherein the switching signal is a signal for requesting a image forming apparatus status.

3. The processing apparatus of claim 1, wherein said image forming apparatus is a printer.

4. An image forming apparatus to communicate with a processing apparatus comprising:

a one-way-communication control unit for establishing communication in a one-way mode with a transmission channel of the processing apparatus; and a two-way-communication control unit for establishing communication in a two-way mode with the transmission channel and a reception channel of the processing apparatus, the image forming apparatus switching from the one-way mode to the two-way mode in response to a switching signal even if the image forming apparatus is offline to accept no signals from the processing apparatus, the switching signal being sent from the processing apparatus to the image forming apparatus through a switching signal line and being a signal in response to which the image forming apparatus can return a response to the processing apparatus through the reception channel, wherein the image forming apparatus switches the one-way mode to a pseudo two-way mode after returning a response to the switching signal, the pseudo two-way mode being a temporary online state in which the image forming apparatus can receive commands from the processing apparatus;

the processing apparatus sends a command to the image forming apparatus to start two-way communication from the pseudo two-way mode if so required; and the processing apparatus sends a command other than the command to start two-way communication to the image forming apparatus if the image forming apparatus must be returned to the one-way mode from the pseudo two-way mode without starting two-way communication.

5. The image forming apparatus of claim 4, wherein the switching signal is a signal for requesting an image forming apparatus status.

6. The image forming apparatus of claim 4, wherein said image forming apparatus is a printer.

7. A controller for an image forming apparatus to communicate with a processing apparatus, comprising:

a one-way-communication control unit for establishing communication in a one-way mode with a transmission channel of the processing apparatus; and a two-way-communication control unit for establishing communication in a two-way mode with the transmission channel and a reception channel of the processing apparatus, the controller switching from the one-way mode to the two-way mode in response to a switching signal even if the image forming apparatus is offline to accept no signals from the processing apparatus, the switching signal being sent from the processing apparatus to the image forming apparatus through a switching signal line and being a signal in response to which the image forming apparatus can return a response to the processing apparatus through the reception channel, wherein the controller switches the one-way mode to a pseudo two-way mode after returning a response to the switching signal, the pseudo two-way mode being a temporary online state in which the image forming apparatus can receive commands from the processing apparatus;

the processing apparatus sends a command to the image forming apparatus to start two-way communication from the pseudo two-way mode if so required; and the processing apparatus sends a command other than the command to start two-way communication to the image forming apparatus if the image forming apparatus must be returned to the one-way mode from the pseudo two-way mode without starting two-way communication.

8. The controller of claim 7, wherein the switching signal is a signal for requesting an image forming apparatus status.

9. The controller of claim 7, wherein said image forming apparatus is a printer.

10. An image forming apparatus system having an image forming apparatus and a processing apparatus to communicate with the image forming apparatus, the processing apparatus comprising:

a mode setting unit for setting one of a one-way mode to establish communication between the processing apparatus and the image forming apparatus through a transmission channel and a two-way mode to establish communication between the processing apparatus and the image forming apparatus through the transmission channel and a reception channel;

a one-way-communication control unit for sending data to the image forming apparatus and if the mode setting unit sets the one-way mode and if the image forming apparatus is online; and a two-way-communication control unit for sending, if the mode setting unit sets the two-way mode, a switching signal to the image forming apparatus through a switching signal line irrespective of whether or not the image forming apparatus is online, the switching signal being used for switching the image forming apparatus to the two-way mode and being a signal in response to which the image forming apparatus can return a response to the processing apparatus through the reception channel, upon receiving a response to the switching signal, the two-way-communication control unit issuing a command to switch the image forming apparatus from the one-way mode to the two-way mode, the image forming apparatus comprising:

a one-way-communication control unit for communicating with the processing apparatus through the transmission channel in the one-way mode; and a two-way-communication control unit for communicating with the processing apparatus through the transmission channel and the reception channel in the two-way mode, the image forming apparatus switching from the one-way mode to the two-way mode upon receiving the switching signal from the processing apparatus through the switching signal line, even if the image forming apparatus is offline, to accept no signals from the processing apparatus, wherein the image forming apparatus is switched from the one-way mode to a pseudo two-way mode after a response to the switching signal is returned, the pseudo two-way mode being a temporary online state in which the image forming apparatus can receive commands from the processing apparatus;

the two-way-communication control unit issues a command to start two-way communication from the pseudo two-way mode if so required; and the two-way-communication control unit issues a command other than the command to start two-way communication if the image forming apparatus must be returned to the one-way mode from the pseudo two-way mode without starting two-way communication.

11. The image forming apparatus system of claim 10, wherein the switching signal is a signal for requesting an image forming apparatus status.

12. The image forming apparatus system of claim 10, wherein
said image forming apparatus is a printer.

13. An image forming apparatus control method for a processing apparatus that communicates with an image forming apparatus, comprising the steps of:

setting the processing apparatus to one of a one-way mode and a two-way mode;

sending data from the processing apparatus to the image forming apparatus if the processing apparatus is set to the one-way mode and if the image forming apparatus is online;

sending, if the processing apparatus is set to the two-way mode, a switching signal from the processing apparatus to the image forming apparatus through a switching signal line irrespective of whether or not the image forming apparatus is online, the switching signal being used for switching the image forming apparatus to the two-way mode and being a signal in response to which the image forming apparatus can return a response to the processing apparatus through a reception channel, upon receiving, at the processing apparatus, a response to the switching signal, issuing a command from the processing apparatus to switch the image forming apparatus from the one-way mode to the two-way mode; and preparing the image forming apparatus for switching from the one-way mode to the two-way mode in response to the switching signal even if the image forming apparatus is offline to accept no signals from the processing apparatus, switching the image forming apparatus from the one-way mode to a pseudo two-way mode after the image forming apparatus returns a response to the switching signal, the pseudo two-way mode being a temporary online state in which the image forming apparatus can receive commands from the processing apparatus;

sending a command to the image forming apparatus to start two-way communication from the pseudo two-way mode if so required; and sending a command other than the command to start two-way communication to the image forming apparatus if the image forming apparatus must be returned to the one-way mode from the pseudo two-way mode without starting two-way communication.

14. The method of claim 13, wherein the switching signal is a signal for requesting an image forming apparatus status.

15. The method of claim 13, wherein
said image forming apparatus is a printer.

16. A medium for recording an image forming apparatus control program for a processing apparatus that communicates with an image forming apparatus, the program comprising the steps of:

setting the processing apparatus to one of a one-way mode and a two-way mode;

sending data from the processing apparatus to the image forming apparatus if the processing apparatus is set to the one-way mode and if the image forming apparatus is online;

sending, if the processing apparatus is set to the two-way mode, a switching signal from the processing apparatus to the image forming apparatus through a switching signal line irrespective of whether or not the image forming apparatus is online, the switching signal being used for switching the image forming apparatus to the two-way mode and being a signal in response to which the image forming apparatus can return a response to the processing apparatus through a reception channel, upon receiving, at the processing apparatus, a response to the switching signal, issuing a command from the processing apparatus to switch the image forming apparatus from the one-way mode to the two-way mode; and preparing the image forming apparatus for switching from the one-way mode to the two-way mode in response to the switching signal, even if the image forming apparatus is offline, to accept no signals from the processing apparatus, wherein the program switches the image forming apparatus from the one-way mode to a pseudo two-way mode after the image forming apparatus returns a response to the switching signal, the pseudo two-way mode being a temporary online state in which the image forming apparatus can receive commands from the processing apparatus;

sends a command to the image forming apparatus to start two-way communication from the pseudo two-way mode if so required; and sends a command other than the command to start two-way communication to the image forming apparatus if the image forming apparatus must be returned to the one-way mode from the pseudo two-way mode without starting two-way communication.

17. The medium of claim 16, wherein the switching signal is a signal for requesting an image forming apparatus status.

18. The medium of claim 16, wherein
said image forming apparatus is a printer.

* * * * *